(12) United States Patent
Ito (10) Patent No.: US 7,743,345 B2
(45) Date of Patent: Jun. 22, 2010

(54) DISPLAY SYSTEM FOR DISPLAYING KEY GROUPS ACCORDING TO THEIR FUNCTIONS

(75) Inventor: Masakazu Ito, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 1120 days.

(21) Appl. No.: 10/724,038

(22) Filed: Dec. 1, 2003

(65) Prior Publication Data

US 2004/0257343 A1    Dec. 23, 2004

(30) Foreign Application Priority Data

Dec. 25, 2002  (JP)  ............... 2002-374063

(51) Int. Cl.
  *G06F 3/048* (2006.01)
(52) U.S. Cl. .................................. 715/854
(58) Field of Classification Search ............. 715/764, 715/773, 810, 854
See application file for complete search history.

(56) References Cited

U.S. PATENT DOCUMENTS

| 5,510,979 A | * | 4/1996 | Moderi et al. ............. 705/18 |
| 5,806,071 A | * | 9/1998 | Balderrama et al. ....... 707/104.1 |
| 5,845,263 A | * | 12/1998 | Camaisa et al. ........... 705/27 |

FOREIGN PATENT DOCUMENTS

| JP | 6-230899 A | 8/1994 |
| JP | 2000-339550 A | 12/2000 |
| JP | 2001-256559 A | 9/2001 |
| JP | 3788884 B2 | 6/2006 |

* cited by examiner

*Primary Examiner*—Thanh T Vu
(74) *Attorney, Agent, or Firm*—Sughrue Mion, PLLC (57) ABSTRACT

Individual keys necessary for operations are grouped into key groups according to their functions. Key groups which do not fall within a display block allotted for all the keys are further divided into sub-groups. Switching keys for switching to other sub-groups are added. An operator operates the switching keys to arrive at the intended key.

6 Claims, 13 Drawing Sheets

ATTRIBUTE INFORMATION OF KEY GROUP #6

| Attribute Section | Value | Field |
|---|---|---|
| GROUP ATTRIBUTE | ALCOHOL | NAME |
| | 450 | X COORDINATE |
| | 360 | Y COORDINATE |
| | 470 | WIDTH |
| | 130 | HEIGHT |
| KEY ATTRIBUTE | BEER | DISPLAY DATA |
| | 20 | KEY x COORDINATE |
| | 20 | KEY y COORDINATE |
| | PLU | LINK DESTINATION ATTRIBUTE |
| | 345 | LINK DESTINATION NUMBER |
| KEY ATTRIBUTE | WINE | |
| | 130 | |
| | 20 | |
| | PLU | |
| | 567 | |
| KEY ATTRIBUTE | SPARKLING ALCOHOLIC DRINK | |
| | 240 | |
| | 20 | |
| | PLU | |
| | 678 | |

DISPLAY SYSTEM FOR DISPLAYING KEY GROUPS ACCORDING TO THEIR FUNCTIONS

BACKGROUND OF THE INVENTION

1. Field of the Invention

The present invention relates to a display system, a display method, and a display program, and more particularly to a display method in which display processing is performed on an operation screen based on key groups, respective keys necessary for each operation being grouped according to their functions while being grouped such that the key groups which the user wishes to display simultaneously fall within a key display area, and a display program for implementing the display method.

2. Description of the Related Art

JP 2001-256559 A discloses a technique applied to a merchandise sales-registration data processor having a touch panel operation screen in which, instead of using a normal registration screen provided with a merchandise category area, a registration history display area, and a scroll key for the merchandise registration screen, a PLU button group is displayed. The PLU button group includes PLU buttons B displayed based on classification of a merchandise category key (PLU group button A) touched by a user.

SUMMARY OF THE INVENTION

It is an object of the present invention to enable updating of individual key groups within a display, to thereby minimize the portion of the display being updated, and decrease time required to update the display.

Another object is to group the keys according to their functions, and simultaneously display the groups which are necessary for processing in each mode. When a functional group cannot be simultaneously displayed, the same display block switches to display each key group obtained by further classifying the keys of the functional group, thereby improving operability.

According to the present invention, there is provided a display system, including:

a key group master memory unit for storing key group master information of a plurality of product keys and at least one key group including a switching key for switching a display to another key group;

a touch panel for displaying the one or more key groups;

a displayed key group attribute information storage unit, for storing, as displayed key group attribute information, the key group master information of the key groups displayed on the touch panel; and display switching means that, when the switching key on the touch panel is pressed, reads out from the key group master memory unit, the key group master information designated according to a link destination attribute and a link destination number in the displayed key group attribute information that corresponds to the pressed switching key, and replaces the key group including the pressed switching key, for the key group corresponding to the key group master information designated according to the link destination attribute and the link destination number for display.

According to the present invention, there is provided a display method, including:

storing into a key group master memory unit key group master information of a plurality of product keys and at least one key group including a switching key for switching to a display to another key group;

displaying the one or more key groups on a touch panel;

storing, as displayed key group attribute information, the key group master information of the key groups displayed on the touch panel; and reading out, when the switching key on the touch panel is pressed, from the key group master memory unit, the key group master information designated according to a link destination attribute and the link destination number inside the displayed key group attribute information that corresponds to the pressed switching key, and replacing the key group including the pressed switching key, for the key group corresponding to the key group master information designated according to the link destination attribute and the link destination number for display.

According to the present invention, there is provided a display program for causing a computer to perform a process, including:

storing into a key group master memory unit key group master information of a plurality of product keys and at least one of key group including a switching key for switching a display to another key group;

displaying the one or more key groups on a touch panel;

storing, as displayed key group attribute information, the key group master information of the key groups displayed on the touch panel; and reading out, when the switching key on the touch panel is pressed, from the key group master memory unit, the key group master information designated according to the link destination attribute and a link destination number in the displayed key group attribute information that corresponds to the pressed switching key, and replacing the key group including the pressed switching key, for the key group corresponding to the key group master information designated according to the link destination attribute and the link destination number for display.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Next, detailed explanation is given regarding an embodiment of the present invention with reference to the drawings.

Figure 1:
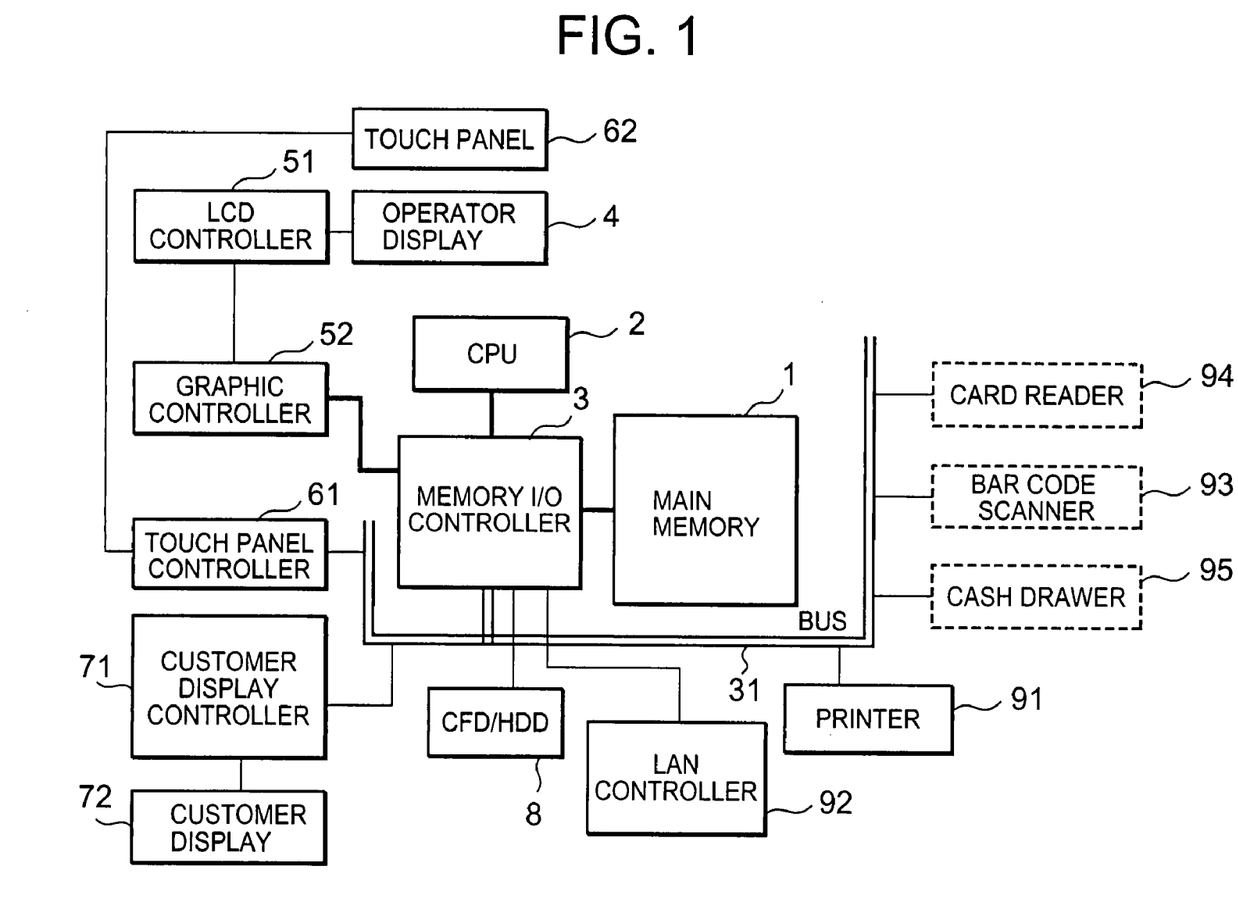
FIG. 1 is a block diagram showing an overall construction of the present invention.

FIG. 1 is a block diagram showing an overall construction of a POS (Point Of Sale) device of the present invention.

The POS device of the present invention is operated by an operator selecting a key on a screen via a touch panel 62. The POS device includes a main memory 1, a CPU 2, a memory I/O controller 3, an operator display 4, an LCD controller 51, and a graphic controller 52.

Connected to the memory I/O controller 3 are a CFD/HDD 8 (Compact Flash®disk/hard disk drive) serving as an auxiliary memory device, a LAN controller 92, and a bus 31.

Connected to the bus 31 are a touch panel controller 61, a customer display controller 71, and a printer 91. The touch panel controller 61 and the customer display controller 71 are connected to the touch panel 62 and a customer display 72 (customer display), respectively.

Further, connected to the bus 31 is a cash drawer 95, or, if needed, a bar code scanner 93 or a card reader 94.

The memory I/O controller 3 controls the CPU 2, the graphic controller 52, and access to the main memory 1 from an internal I/O controller. Further, the memory I/O controller 3 conducts I/O control of the CFD/HDD 8 and controls the bus 31.

The operator display 4 is an LCD or the like for displaying the operation screen. The touch panel 62 is provided close to this screen, and an operator selects the keys displayed on the operation screen through the touch panel.

Figure 12:
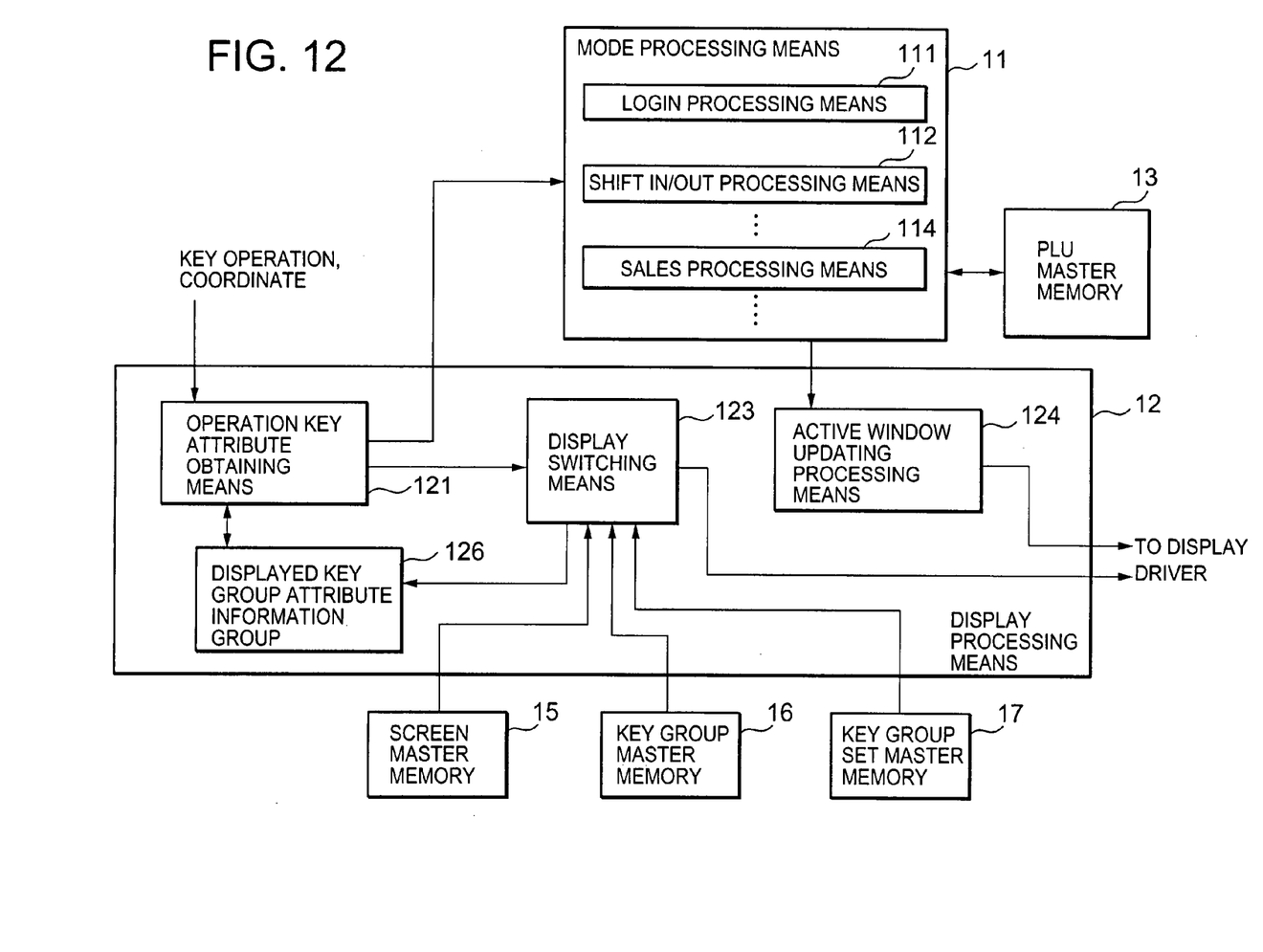
FIG. 12 is a block diagram showing a unit used in performing display processing.

Referring to FIG. 12, the CFD/HDD 8 includes an operating system (OS) for operating the CPU 2, mode processing means 11, display processing means 12, a screen master memory 15, a key group master memory 16, a key group set master memory 17, and a PLU (Price Look Up) master memory 13.

When the operator performs sales registration with respect to a sales item ordered by a customer, the customer display 72 displays the name of the sales item and its price, along with a discount, cost, sub-total, total, etc., for the customer.

The printer 91 prints a receipt or the like when performing the sales processing for the sales item.

The main memory 1 is constituted of a DRAM or the like. As a part of the processing for booting up the POS device, information from the OS, the mode processing means 11, the display processing means 12, the screen master memory 15, the key group master memory 16, the key group set master memory 17, and the PLU master memory 13 are loaded from the CFD/HDD 8.

The LAN controller 92 performs LAN communications between the POS device and a host device such as a server. For example, before starting transactions, the latest PLU master information or PLU update content information is sent from the host device, and the POS device updates its own PLU master memory 13.

Further, when it is necessary to change the key group master memory 16 or the key group set master memory 17, the latest information or the update content are sent from the host device. The POS device uses this to update the key group master memory 16 and the key group set master memory 17.

Figure 2:
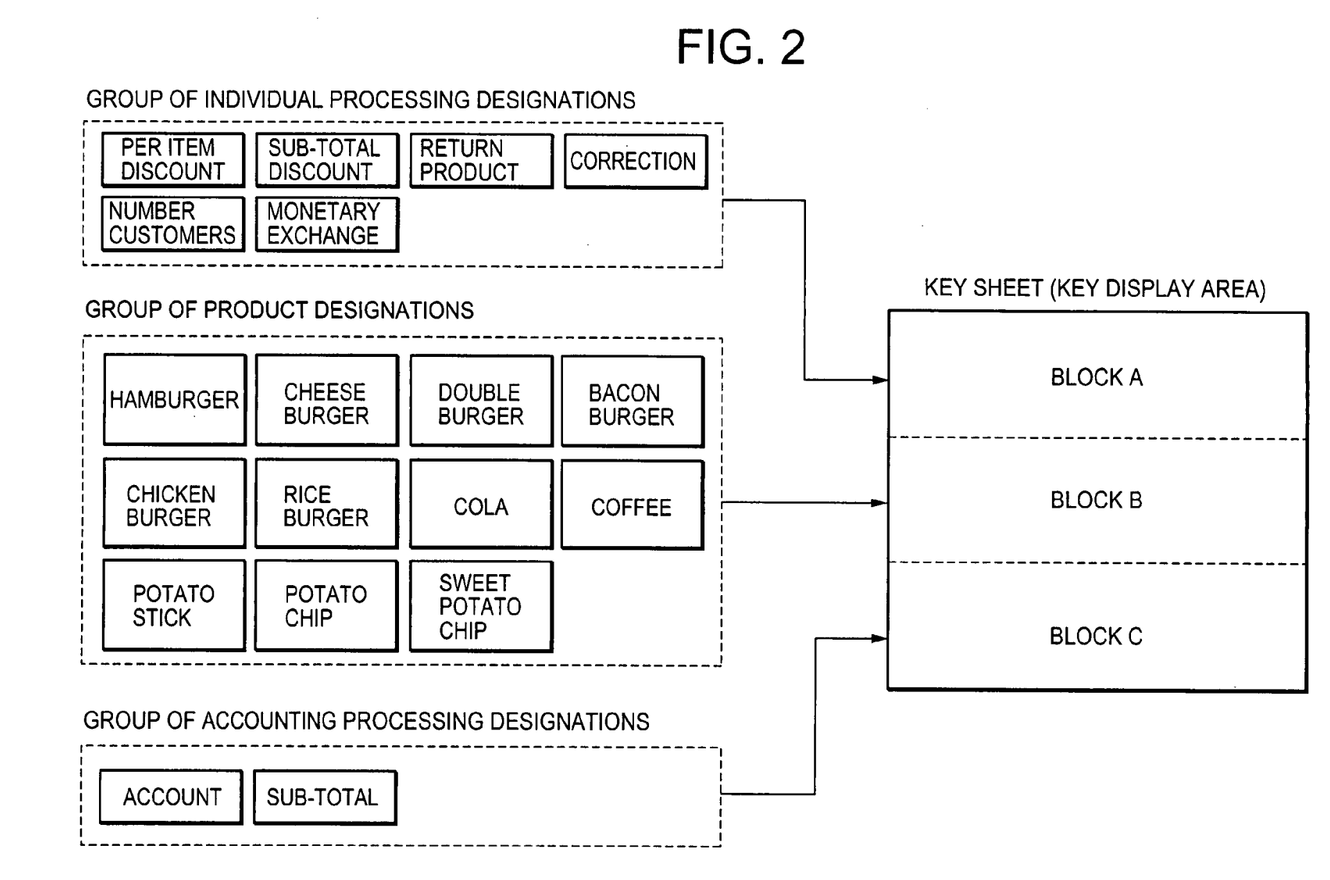
FIG. 2 is an explanatory diagram showing key groups which are a feature of the present invention by taking sales processing keys used in a fast food store as an example.
Figure 3:
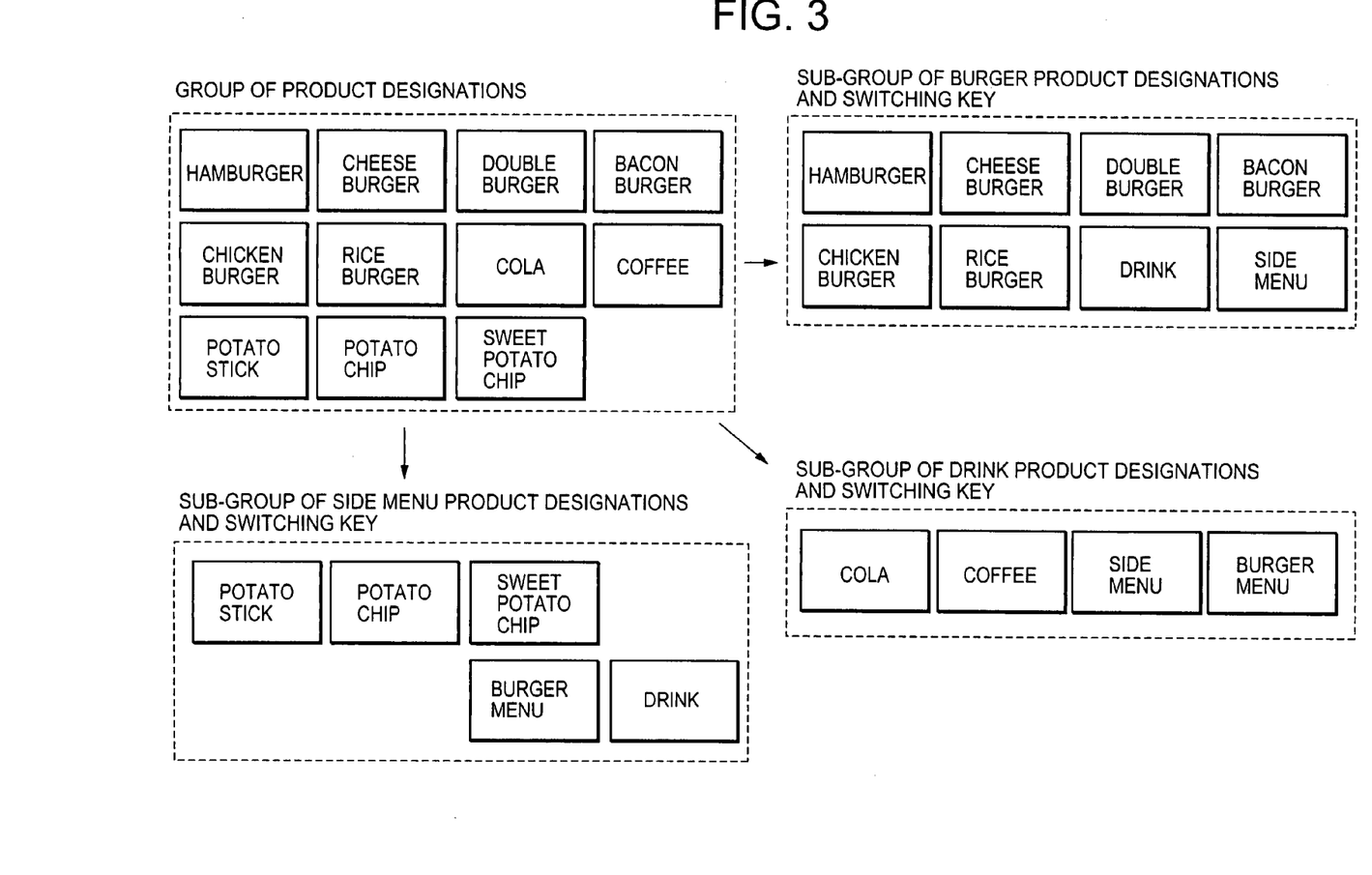
FIG. 3 is an explanatory diagram showing sub-groups of keys in a product designation group shown in FIG. 2.

Next, explanation is given regarding the key group, which is a feature of the present invention by way of an example with reference made to FIGS. 2 and 3. FIG. 2 is an explanatory diagram showing an example of functional groups in the POS device used at a fast food store. Each group is composed of keys necessary for sales processing which are grouped according to their functions.

In FIG. 2, the functional groups include an individual processing designation group, a product designation group, and an account processing designation group.

The individual processing designation group includes key for designating individual processing, i.e., "per item discount", "sub-total discount", "return product", "correction", "number of customers", and "monetary exchange".

The "per item discount"-key is selected before designating a discount when handling discounted products. The "sub-total discount" key is selected before designating a discount on the sub-total. The "return product" key is selected before designating a product that was registered but is being returned.

The "correction" key is for correcting the name of an erroneously registered product. The "number of customers" key is operated either at the beginning or the end of the sales operation, to count the number of customers who purchased products. The "monetary exchange" key is operated to open the cash drawer 95 of the POS device regardless of the operation of a "total" key.

The keys in the individual processing designation group are operated in connection with sales.

The product designation group includes keys for designating products such as "hamburger", "cheeseburger", . . . "potato chips", etc.

The account processing designation group includes keys for designating account processing, i.e., "total" and "sub-total".

The "sub-total" key is for calculating and displaying a sub-total after registering all the products purchased by an arbitrary customer. The "total" key is for displaying the total after adding sales tax to the sub-total, and opening the cash drawer 95.

The keys in the individual processing designation group, the keys in the product designation group, and the keys in the account processing designation group are operated one after another in a predetermined sequence. Therefore, those functional groups must be displayed simultaneously on a key sheet 42 (key display area). However, the size of the key sheet 42 is smaller than the size of the screen, so that not all the keys for respective functional groups can be displayed at the same time. Therefore, it is necessary to redivide some of the functional groups into sub-groups.

In, other words, the key sheet 42 is equally divided into 3 portions, block A, block B and block C, and the divided portions are assigned to the individual processing designation group, the product designation group, and the account processing designation group. The individual processing designation group and the account processing designation group are contained in the block A and the block C, respectively. The account processing designation group leaves a margin of extra space.

The product designation group does not fall within the block B even if the extra space of the block C is used. Therefore it is redivided into sub-groups.

FIG. 3 is an explanatory diagram showing the redivision of the keys in the product designation group.

Referring to FIG. 3, the product designation group is further divided into a burger product designation sub-group, a drink designation sub-group, and a side menu product designation sub-group. Each sub-group has keys for switching the display over to the other sub-groups.

More specifically, the burger product designation sub-group has a "drink" key and a "side menu" key for switching over the display. The drink product designation sub-group has a "side menu" key and a "burger menu" key for switching over the display. The side menu product designation sub-group has a "burger menu" key and a "drink" key for switching over the display.

Further, the processing modes are defined as a sales processing mode, a login processing mode, a shift in/out registration processing mode (processing for registering times when employees start and end their shifts), a sales data processing mode (sales sums per product, total sales, number of customers, etc. on the daily basis).

The account processing designation group is added with a mode switching key for switching from the sales processing mode to other processing modes (i.e. a key for calling up a processing mode selection screen, or a key for switching to an adjacent mode).

Then, the following key group numbers are assigned: a key group #1 is assigned to the individual processing designation group, a key group #3 is assigned to the burger product designation group after further providing the switching key, a key group #4 is assigned to the drink product designation group after further providing the switching key, a key group #5 is assigned to the side menu product designation group after further providing the key switch, and a key group #2 is assigned to the account processing designation group.

Note that, in the above-mentioned example the product designation group was further divided into sub-groups. However, it is also possible to leave the product designation group in FIG. 2 just as it is. In this case, the individual processing designation group is further divided into a sub-group including a "per item discount" key, a "sub-total key, and a "correction" key, and another sub-group including a "return product" key, a "number of customers" key, and a "monetary exchange" key. Each of the sub-group is added with a switching key. In this case, each of the sub-groups, the product designation group, and the account processing group serve as the key groups.

Figure 4:
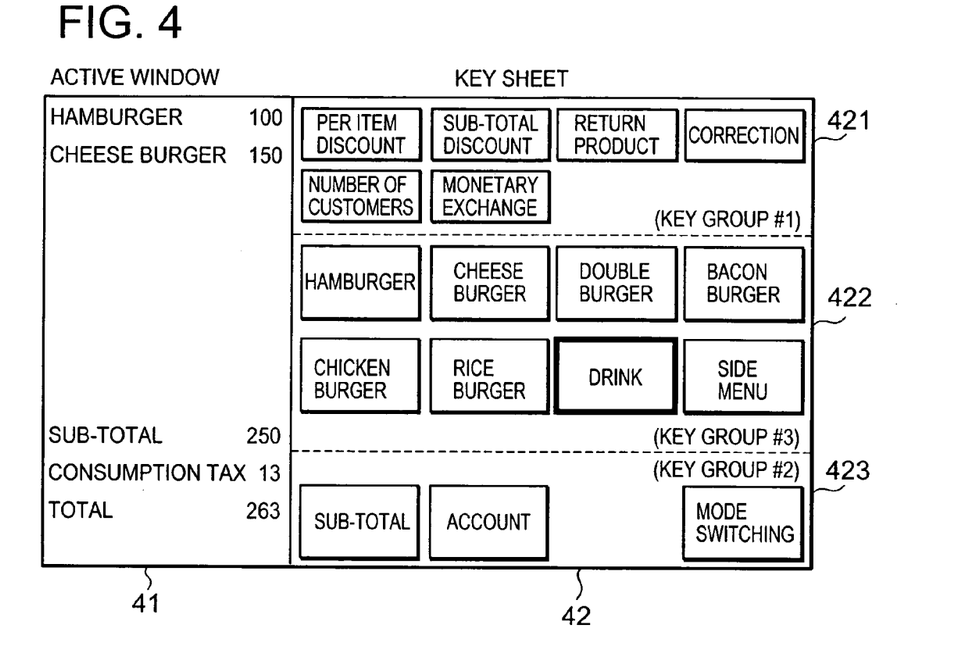
FIG. 4 is an explanatory diagram showing a screen appearing at the beginning of sales processing according to the present invention.
Figure 5:
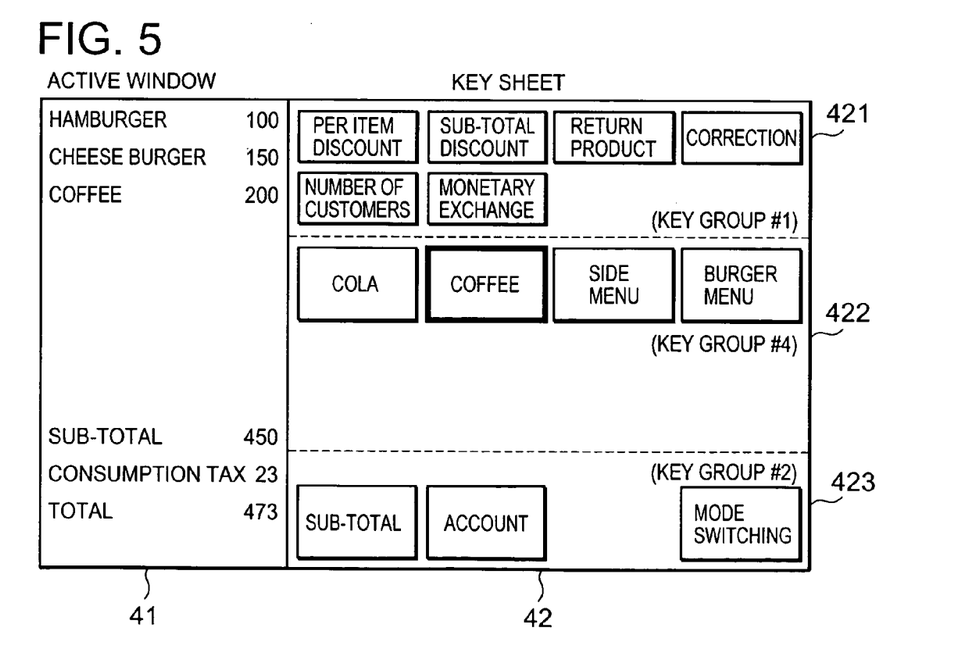
FIG. 5 is an explanatory diagram showing a screen to which the display switches upon selection of a drink key shown in FIG. 4.

Next, explanation is given regarding the sales processing screen of the POS device with reference made to FIG. 4 and FIG. 5.

The screen master memory 15 includes an active window 41 for displaying sales details and the key sheet 42 (key display area), which are used to obtain the screen master information corresponding to the sales processing mode. The key sheet 42 is defined by the key group #1, the key group #2, and the key group #3.

When the sales processing starts, the key sheet 42 is displayed as shown in FIG. 4. When, for example, the operator designates "hamburger", information corresponding to hamburger in the PLU master memory 13 is obtained, according to attribute information (link destination attributes and link destination number) of the hamburger key in the keygroup#3, which is included in a displayed key group attribute information group 126. Then, the product name (hamburger) and the product unit price (100 yen) are registered and displayed in the active window 41.

Next, for example, when the operator designates "drink", the key group #4 attribute information is obtained according to attribute information (link destination attributes and link destination number) of the drink key in the key group #3, which is included in the displayed key group attribute information group 126. Also, as shown in FIG. 5, the display switches from the key group #3 to the key group #4.

Further, the display of the key group #3 attribute information (which is included in the displayed key group attribute information group 126) switches to the display of the key group #4 attribute information.

When the operator designates "coffee", information corresponding to coffee in the PLU master memory 13 is obtained according to attribute information (link destination attributes and link destination number) of the coffee key in the key group #4, which is included in the displayed key group attribute information group 126. Then, the product name (coffee) and the product unit price (200 yen) are registered and displayed in the active window 41.

Figure 6:
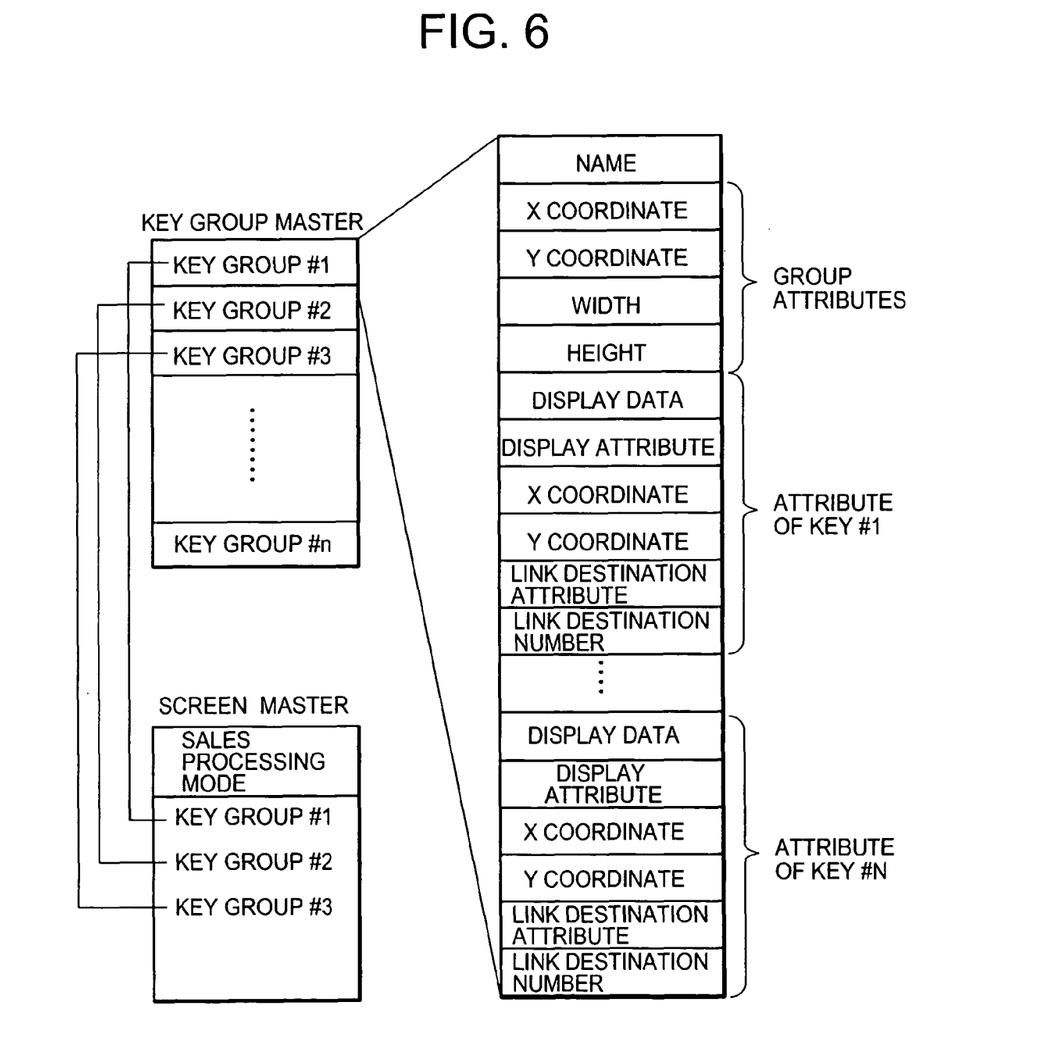
FIG. 6 is an explanatory diagram showing a construction of a key group master memory according to the present invention.
Figure 7:
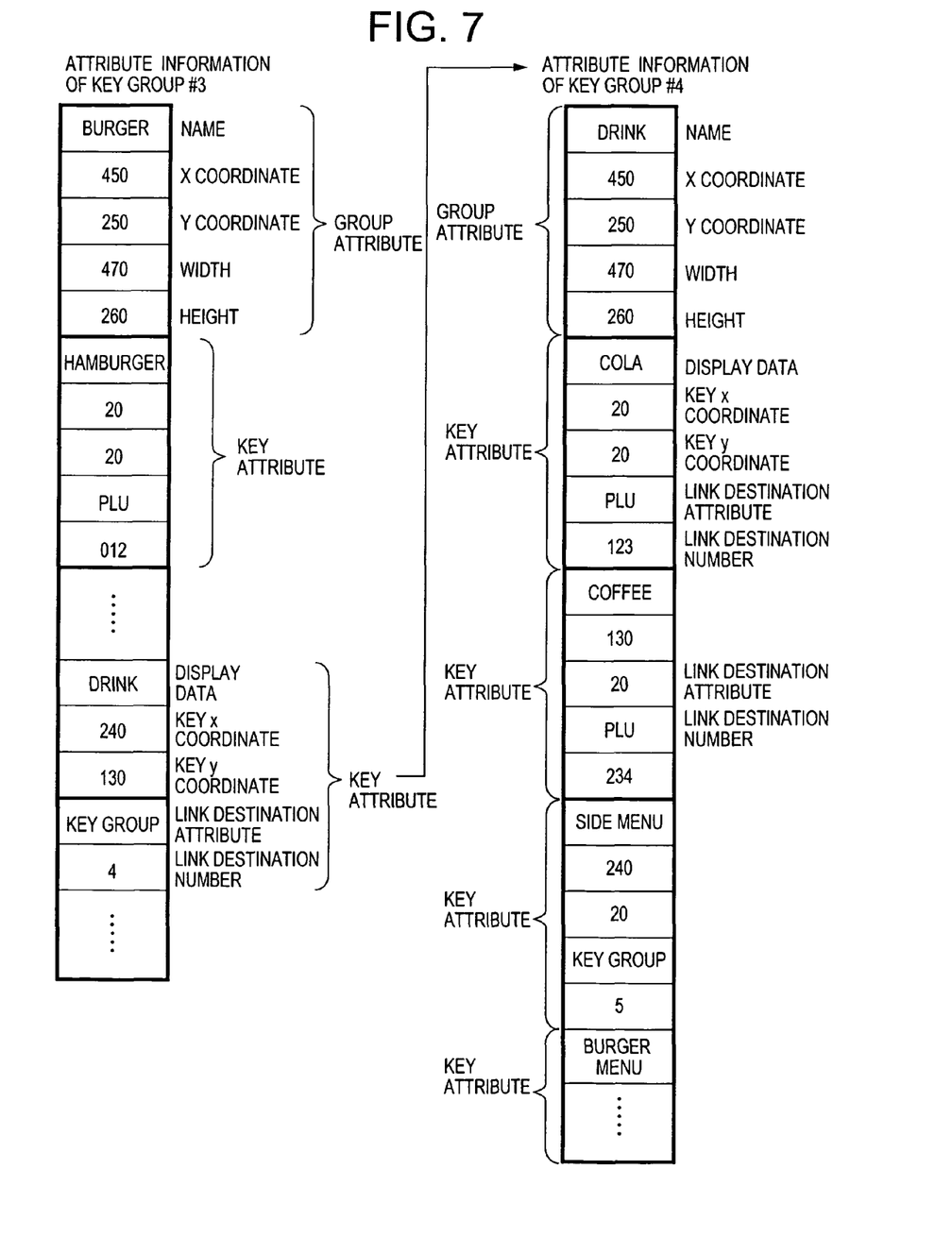
FIG. 7 is an explanatory diagram showing attribute information of key groups #3 and #4 in the key group master.

Next, with reference to FIG. 6 and FIG. 7, explanation is given regarding a configuration of the key group master memory 16. FIG. 6 is an explanatory diagram showing a configuration of the key group master in the key group master memory 16. The key group master is a collection of n pieces of key group attribute information.

Each piece of key group attribute information contains group attributes including a name, an X coordinate, a Y coordinate, a width, and a height. The X coordinate and the Y coordinate are horizontal and vertical coordinates in the screen with respect to a reference point (e.g., top-left point) indicating a display area (or a frame) for the key group. The width and the height are the width and the height of the display area (or the frame) for the key group. Here, it is assumed that the point of origin in the screen is at the top-left.

Further, the attribute information of each of the keys that are members of the key group, include the following as key attributes: display data, display attributes, an x coordinate, a y coordinate, link destination attributes, and a link destination number. The display data includes text to be displayed and a graphic code. The display attributes include a font designation, and a default designation is also possible. The x coordinate and the y coordinate indicate key positions within the key group display area.

The link destination attributes and the link destination number are included in the category of the key functional attributes, and are used to designate an access destination table and a number within that table as well as to designate processing performed after the access destination table and the number within the table are obtained.

FIG. 7 is an explanatory diagram showing attribute information of the key group #3, and of key group #4, which is called up from the drink keys inside key group #3.

In the drink key attribute information, the link destination attribute is the key group (key group master), and the link destination number is 4. Therefore, the key group #4 attribute information is obtained from the key group master, and the key group #4 is displayed. Here, coordinates and the size of the key group #3 attribute information conform with those of the key group #4 attribute information. Therefore, display of the block 422 simply changes from key group #3 to key group #4.

The link destination attribute contained in attribute information of a "coffee" key in the key group #4 is PLU (PLU master), and the link destination number is 234. Therefore, the code 234 in the PLU master in the PLU master memory 13 is obtained. Then the product name (coffee) and the product unit price (200 yen) are displayed in the active window 41.

Figure 8:
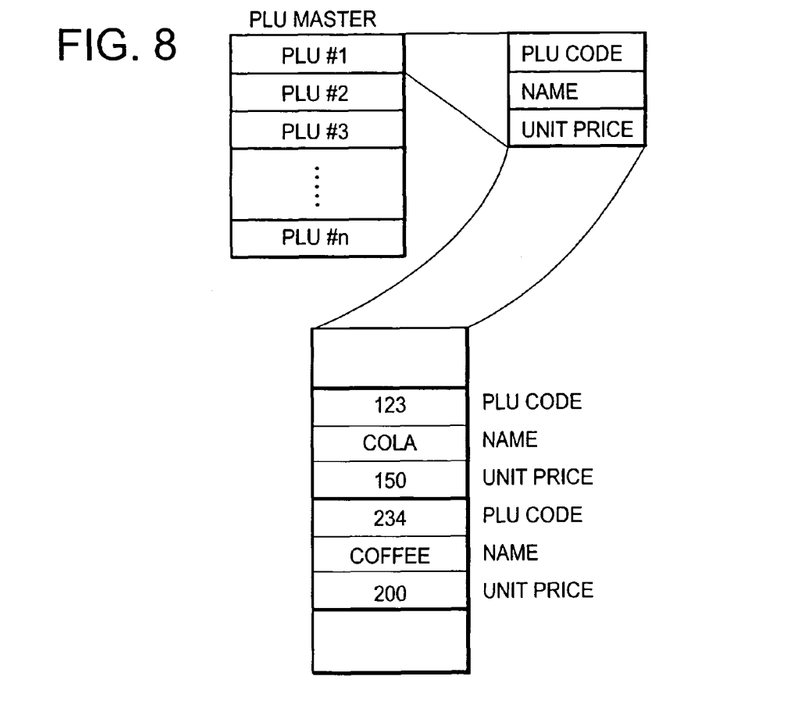
FIG. 8 is an explanatory diagram showing a construction of a PLU master.

FIG. 8 is an explanatory diagram showing a configuration of the PLU master. The PLU master in the PLU master memory 13 includes a PLU code, a name (product name, named of service, etc.), and a product unit price. The first information indicates that the name of the product assigned PLU code 123 is "cola", and its unit price is "150 yen".

Next, explanation is given regarding an example of settings of the key groups, etc. in a case where the present invention is used for a food store with a different product menu.

This store handles, in addition to cola and coffee, alcoholic beverages unique to the store. Yet the store needs to minimize additions and modifications to the settings of the key groups, etc.

In such case, the key group set master memory 17 (which stores the key group set master defining the key group sets which are key groups) is used.

Figure 9:
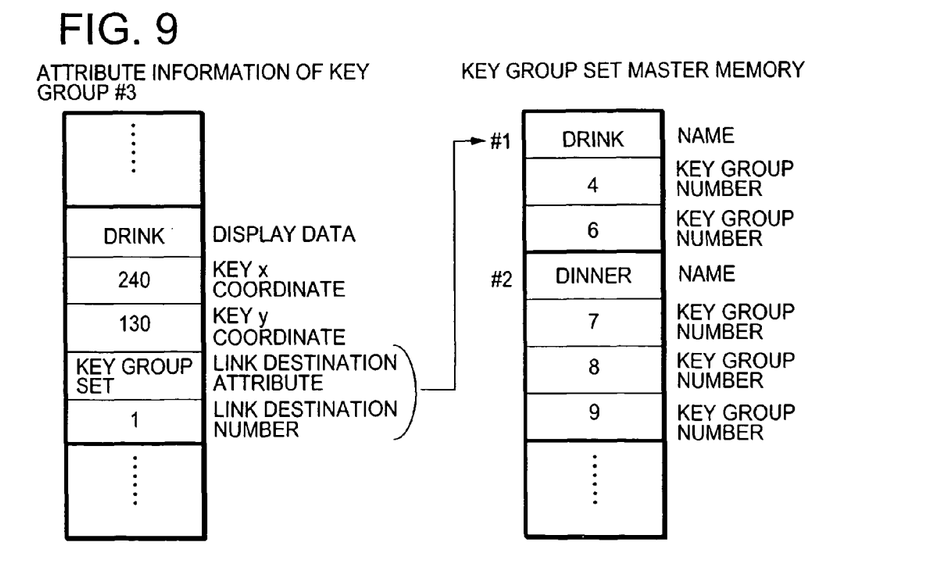
FIG. 9 is an explanatory diagram showing an example of a key group master and a key group set master.

Referring to FIG. 9, a set name "drinks" is assigned to the first information in the key group set master memory 17. "Drinks" is a combination of the key group #4 and the key group #6.

Further, the link destination attributes and the link destination number for the "drink" key in the key group #3 are a key group set #1.

Figure 10:
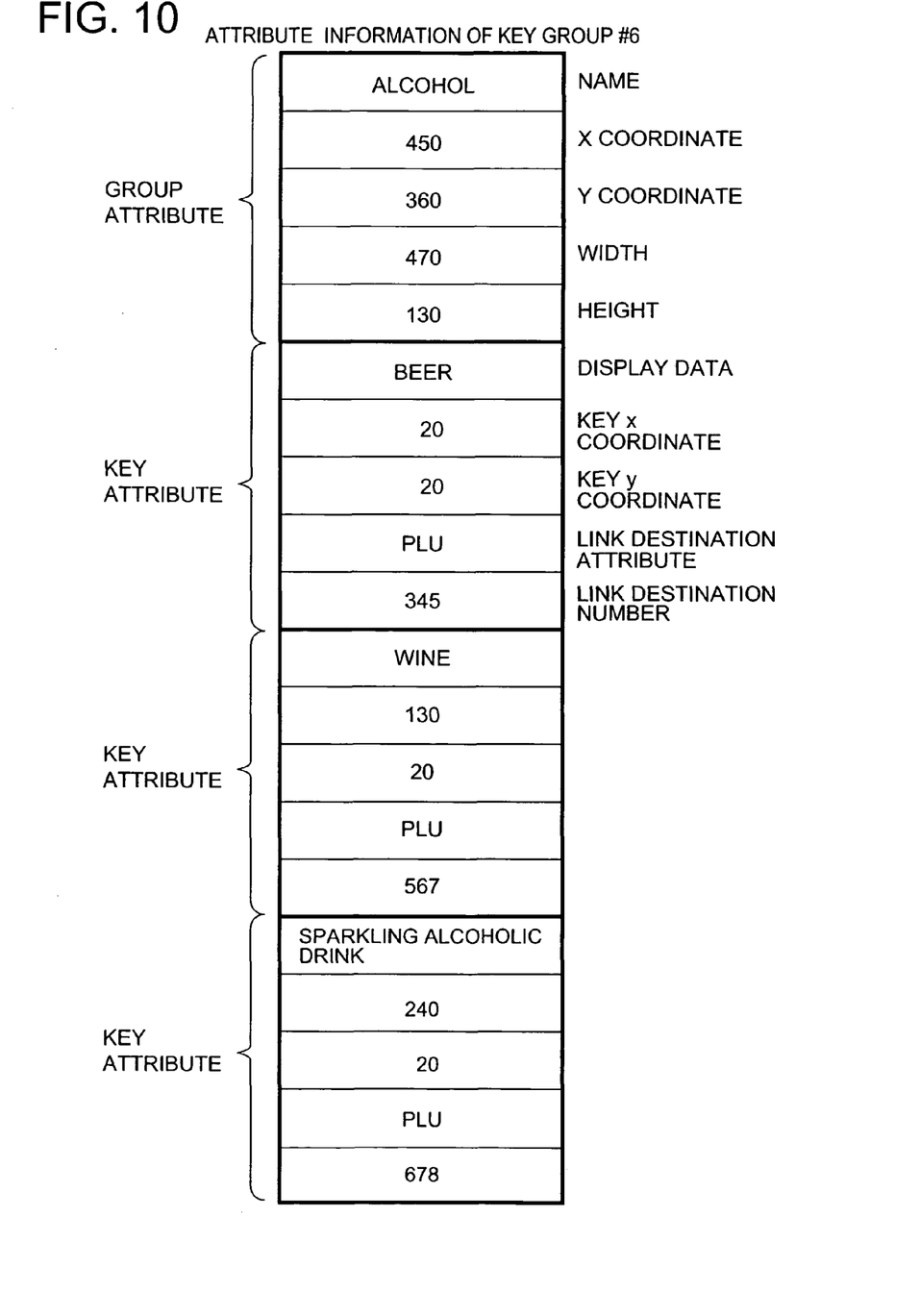
FIG. 10 is an explanatory diagram showing attribute information of a key group #6 in the key group master.

Referring to FIG. 10, for the key group #6, the group attribute name is "alcohol" and the member keys are "beer", "wine" and "low-malt beer".

Figure 11:
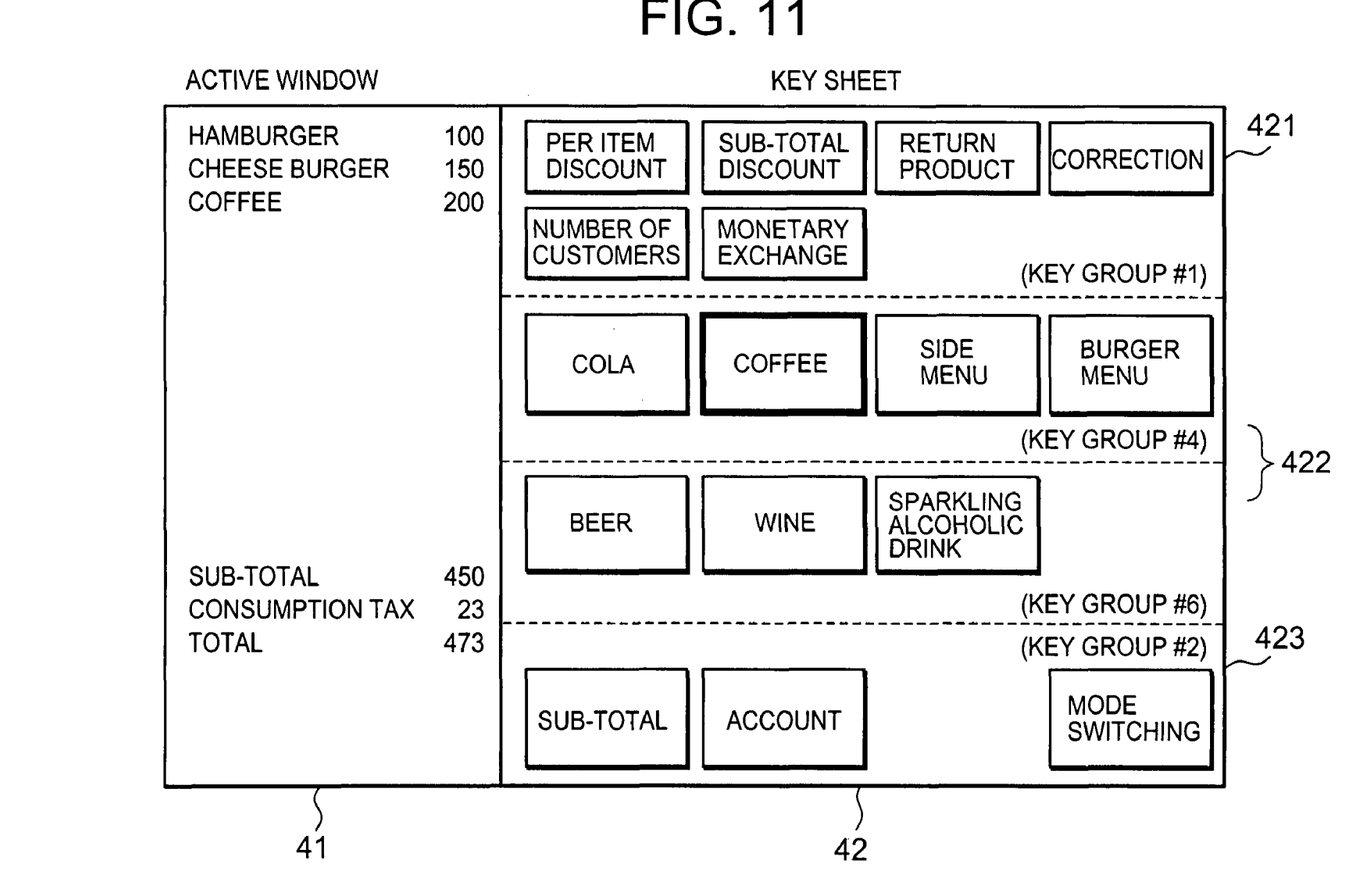
FIG. 11 is an explanatory diagram showing a screen to which the display switches upon selection of the drink key shown in FIG. 4.

Therefore, when the user selects the "drink" key in FIG. 4, the block 422 in the key sheet 42 changes to the block 422 display (key group #4, key group #6) shown in FIG. 11.

Further, even in the same store, it is easy to handle setting changes for products sold during limited seasons.

For example, if the fast food store sells ice coffee, ice tea and shakes only in spring and summer seasons, then the key group #6 can be set as "drinks (spring/summer)", and its member keys can be defined as "ice coffee", "ice tea" and "shake". The link destination attributes and link destination numbers of the "drink" key of key group #3 can be changed every year.

FIG. 12. is a block diagram showing a unit relating to the display processing performed for the operator display 4 of the POS device according to the present invention.

In FIG. 12, the mode processing means 11 includes login processing means 111, shift in/out processing means 112, and a sales processing means 114. When the operator starts to use the POS device, the operator inputs his/her user name and password via the operation screen (operator display 4 and touch panel 62) to the login processing means 111 to thereby approve subsequent operations. The shift in/out processing means 112 is for registering times when the employees start and end their shifts, via the operation screen.

The sales processing means 114 conducts sales registration of the individual products sold to the customer, displays a total calculated by adding sales tax to the displayed sub-total, and then issues a receipt.

The display processing means 12 includes operation key attribute obtaining means 121, a display switching means 123, active window updating processing means 124, and the displayed key group attribute information group 126.

The content stored in the PLU master memory 13, the screen master memory 15, the key group master memory 16, and the key group set master memory 17, are used after being loaded into the main memory 1, or into the cache memory of the CPU 2.

Note that, the mode processing means 11 can be realized by a program that is loaded into the main memory 1 or the like, and is operated by the POS device. The display processing means 12 can also be realized by implementing a program. Further, the operation key attribute obtaining means 121, the display switching means 123 and the active window updating processing means 124 can also be realized by implementing a program.

Next, operations of the present invention are explained with reference to the drawings.

First, explanation is given regarding operations for switching from each of the processing modes to the other processing modes.

Figure 13:
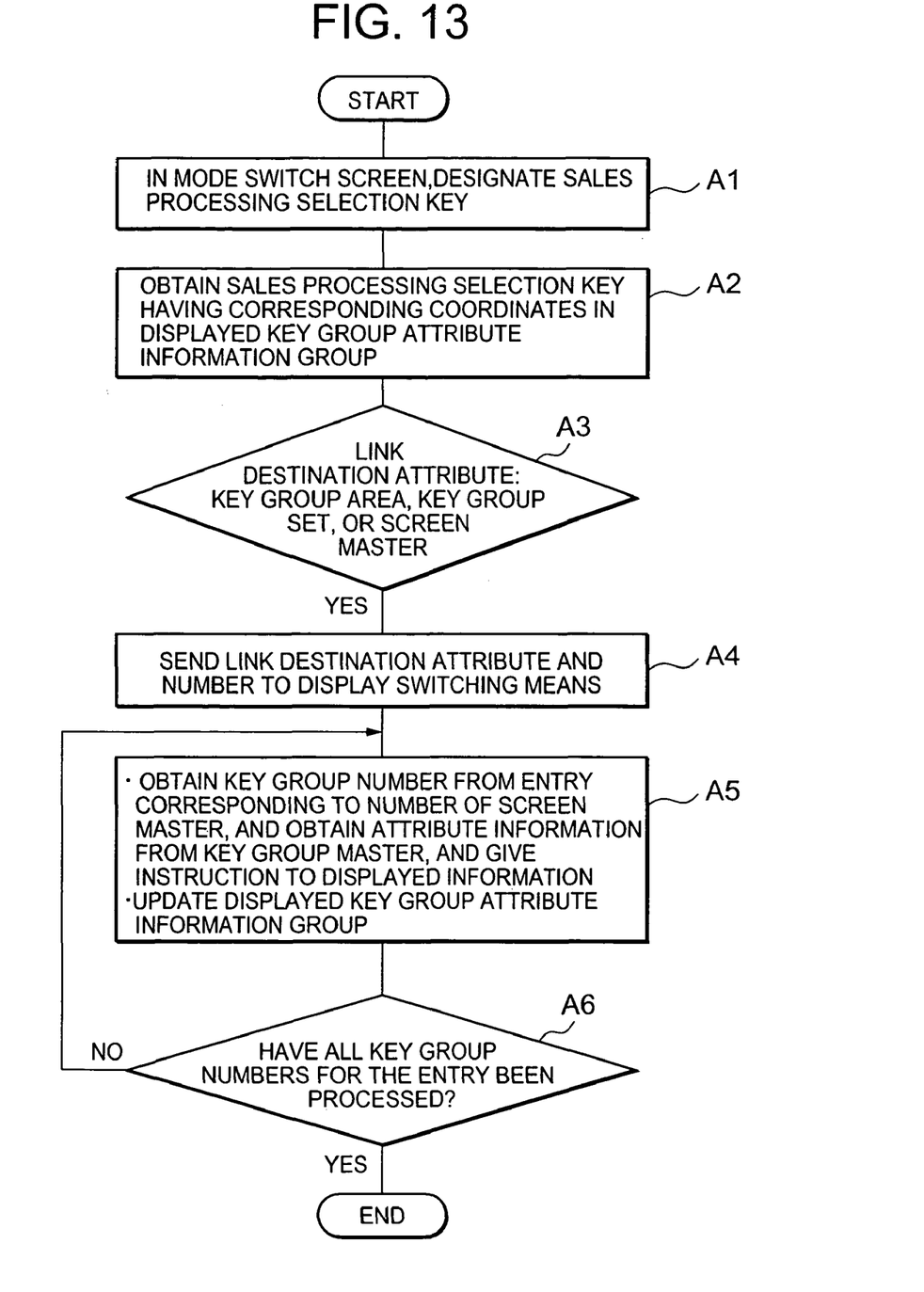
FIG. 13 is a flowchart showing processing of switching to a sales processing mode screen.

FIG. 13 is a flowchart showing operations of the display processing, in a case where an operation was performed on the POS device to switch to the sales processing mode screen.

Switching from each of the processing modes (the sales processing mode, the login processing mode, the shift in/out registration processing mode, and the sales data processing mode) to the other processing modes, is achieved by adding key attributes for displaying a mode switching screen, to the mode switching key. The mode switching screen (not shown in the diagram) includes keys corresponding to each processing mode, which are for switching to each processing mode.

The operator operates the mode switching key in the key sheet 42, and then when the operator designates the sales processing selection key (not shown in the diagram) for switching over to the sales processing mode (FIG. 13, step A1), the operation key attribute obtaining means 121 obtains the key touch event and the coordinates from the touch panel controller 61. Next, the operation key attribute obtaining means 121 establishes the correspondence between the received coordinates and the coordinates in the displayed key group attribute information group 126 (coordinates calculated by adding the coordinates in the key group to the X, Y coordinates of the key group), and determines that the designated key is the sales processing selection key, and obtains the key attributes (link destination attributes and link destination number) of the sales processing selection key (step A2).

Next, the operation key attribute obtaining means 121 verifies the link destination attributes (step A3). Since the link destination attributes indicate the screen master (which is in the screen master memory 15), the link destination attributes and the link destination number are transferred over to the display switching means 123 (step A4).

From the screen master in the screen master memory 15 (see FIG. 6), the display switching means 123 obtains all the key group numbers included in the sales processing screen. Also, from the key group master in the key group master memory 16, the display switching means 123 obtains the key group attribute information corresponding to all the obtained key group numbers. Next, the display switching means 123 instructs a display driver to display all the obtained key groups, and updates the attribute information of the displayed key group attribute information group 126 to the obtained attribute information (step A5, A6). By performing the above-mentioned processing, the active window 41 (only the window) and the key sheet 42 (including each key group) are displayed on the touch panel 62.

Figure 14:
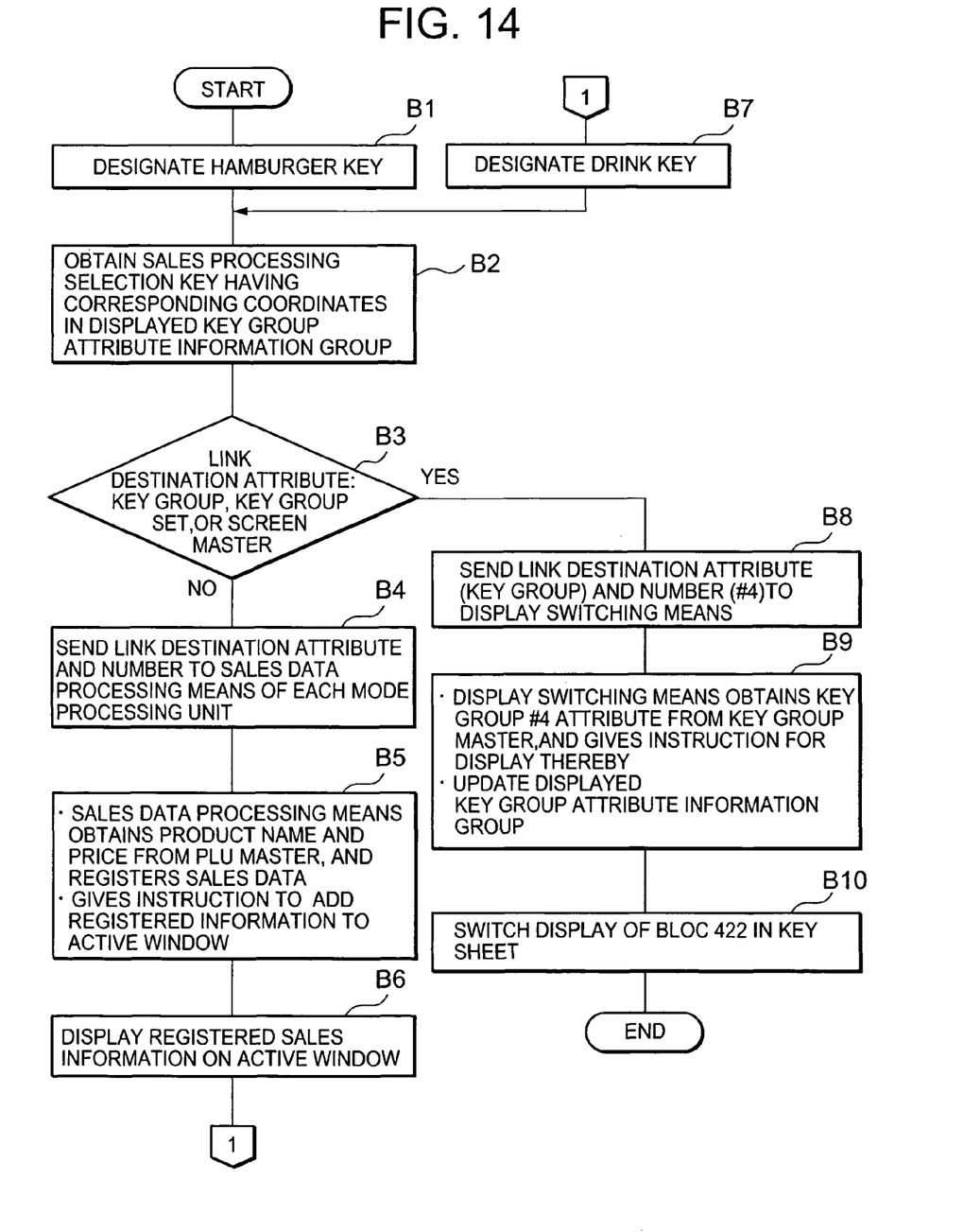
FIG. 14 is a flowchart showing an example of display processing performed in the sales processing.

Next, FIG. 14 is referenced to explain operations of the display processing which is performed as a part of the sales processing. Note that, the content of key group #3 is set for the fast food store.

The operator designates the "hamburger" key (FIG. 14, step B1). The operation key attribute obtaining means 121 obtains the key touch event and the coordinates, and obtains the attributes for the key ("hamburger"), corresponding to the coordinates in the displayed key group attribute information group 126, which matches the obtained coordinates (step B2).

Since the link destination attributes indicate PLU (step B3/NO), the operation key attribute obtaining means 121 transfers the link destination attributes (PLU) and the link destination number (PLU code 012) to the sales processing means 114 of the mode processing means 11 (step B4).

The sales processing means 114 obtains the product name and the product unit price from the PLU master in the PLU master memory 13, conducts sales registration, and then instructs a display driver via the active window updating processing means 124 to display the registered information onto the active window 41 (step B5). The registered sales information (product name, product unit price) are displayed in the active window 41 (step B6).

When the operator designates the "drink" key (step B7), the operation key attribute obtaining means 121 obtains the key touch event and the coordinates, and obtains the attributes for the key ("drink" key), corresponding to the coordinates in the displayed key group attribute information group 126, which matches the obtained coordinates (step B2).

Since the link destination attributes indicate a key group (step B3/YES), the operation key attribute obtaining means 121 transfers the link destination attributes (key group) and the link destination number (#4) to the display switching means 123 (step B8).

The display switching means 123 obtains the key group #4 attribute information from the key group master in the key group master memory 16, instructs the display driver to display the obtained attribute information, and then partially updates the displayed key group attribute information group 126 to the obtained attribute information (step B9).

By performing the foregoing processing, the display of the block 422 in the key sheet 42 switches to the display shown in FIG. 5 (B10).

Here, consideration is given to the thoughts of the human (operator), using the fast food sales processing as an example. First, the operator probably calls up "hamburgers", "drinks", "side menu items", "other sales", "account processing", etc.

After that, the operator selects internal functions (individual menu items), such as a certain kind of hamburger (e.g., cheeseburger, etc.), a certain kind of drink (e.g., cola, etc.), a certain kind of side menu item (e.g., potato sticks, potato chips, etc.).

Thus, the present invention enables the operation screens to progress in line with the thoughts of the human operator.

Figure 15:
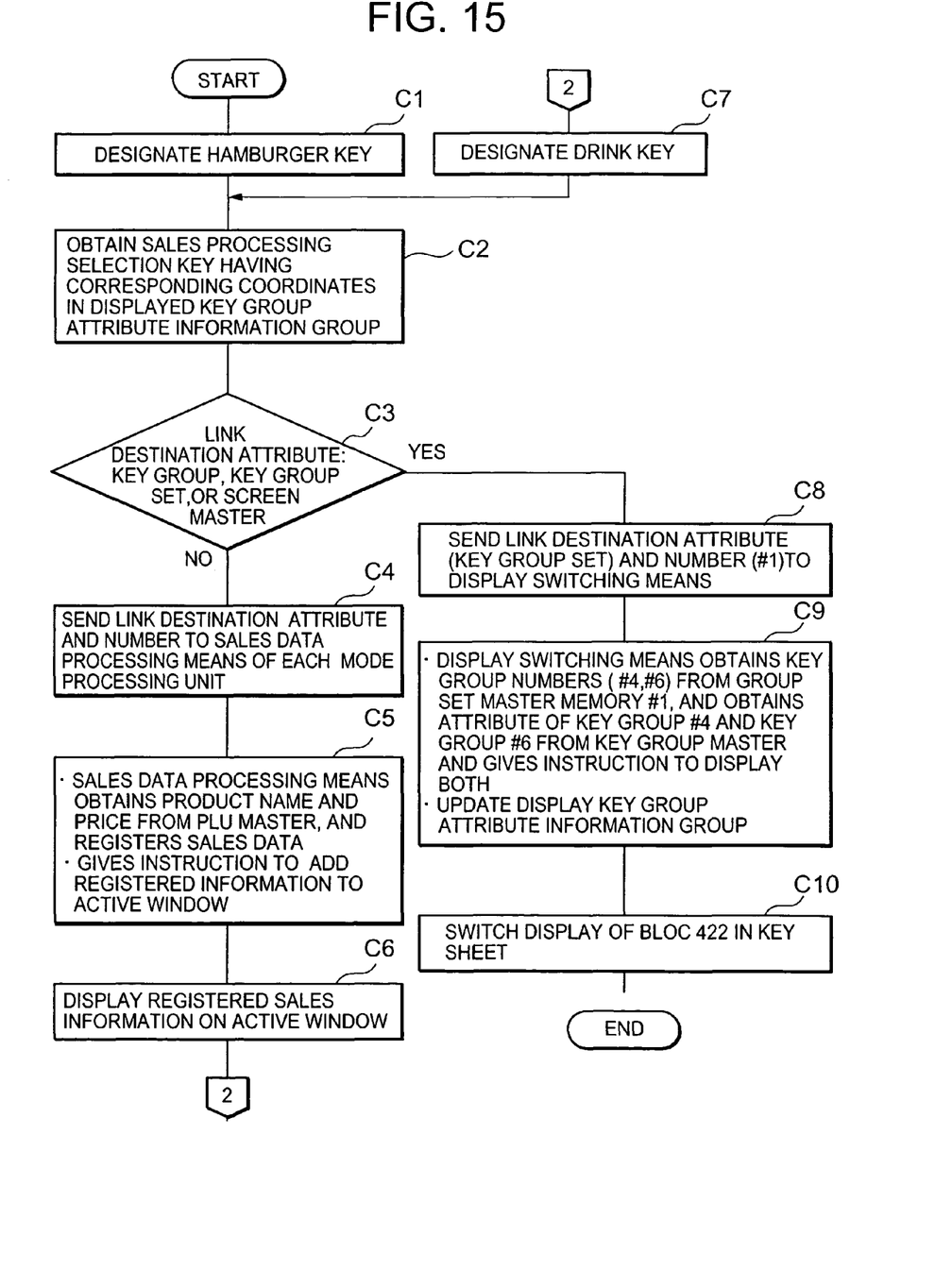
FIG. 15 is a flowchart showing another example of display processing performed in the sales processing.

Next, the flowchart in FIG. 15 is used to explain the operations performed in the display processing for sales processing that takes place when the content of key group #3 is configured for the fast food store. When the hamburger key is designated, the processing operations of steps C1 to C6 are similar to those of the above-mentioned steps B1 to B6.

When the operator designates the "drink" key (FIG. 15, step C7), the operation key attribute obtaining means 121 obtains the key touch event and the coordinates, and obtains the attributes for the key ("drink" key), corresponding to the coordinates in the displayed key group attribute information group 126 (step C2).

Since the link destination attributes indicate a key group set (step C3), the operation key attribute obtaining means 121 transfers the link destination attributes (key group set) and the link destination number (#1) to the display switching means 123 (step C8).

The display switching means 123 obtains the key group numbers (#4, #6) from the key group set master #1 in the key group set master memory 17, and obtains the attributes of key group #4 and key group #6 from the key group master in the key group master memory 16, and then instructs the display driver to perform a display according to the attributes of key group #4 and key group #6.

Further, the display switching means 123 updates the displayed key group attribute information group 126 to the key group #4 attribute information and the key group #6 attribute information (step C9).

Thus the display of the block 422 in the key sheet 42 switches to the display shown in FIG. 11 (step C10).

In the above-mentioned explanation, the fast food store was used as an example and hamburgers, etc. as the sales items. However, the sales items are not restricted to merchandise, but may also include services.

Further, in the above-mentioned explanations the present invention was described in connection with a POS device, in which the keys on the screen are selected via the touch panel 62 to operate the POS device. However, the present invention may also be applied in a terminal device, a portable device, an information processing device, etc.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A display system, comprising:
a touch panel that simultaneously displays a first key group and a second key group, the second key group including a product key and a first switching key, the first switching key switching a display to replace the second key group with a third key group on one display;
a display switching unit that, in response to a pressed the first switching key, replaces the second key group with the third key group on the display of the touch panel so that the first key group and the third key group are simultaneously displayed;
a key group master memory unit that stores key group master information for the first, the second, and the third key groups;
a displayed key group attribute information storage unit, that stores, as displayed key group attribute information, the key group master information of the first, the second, and the third key groups that are being displayed on the display of the touch panel; and
a operation key attribute obtaining unit that, in response to the pressed first switching key, obtains a link destination attribute and a link destination number in the displayed key group attribute information that corresponds to the first switching key, and outputs the link destination attribute and the link destination number to the display switching unit;
wherein the display switching unit that, in response to receiving the link destination attribute and the link destination number from the operation key attribute obtaining unit, reads out from the key group master memory unit, the key group master information designated according to a received link destination attribute and a received link destination number in the displayed key group attribute information that corresponds to the pressed first switching key, and replaces only the second key group with the third key group corresponding to the key group master information designated according to the link destination attribute and the link destination number for display on the touch panel, and updates the displayed key group attribute information by replacing only the key group master information of the second key group with the third key group.

2. The display system according to claim 1, further comprising:
a price look-up (PLU) master memory unit that stores PLU master information including a product name and a product unit price;
the operation key attribute obtaining unit that, in response to the pressed product key, obtains a link destination attribute and a link destination number in the displayed key group attribute information that corresponds to the pressed product key and outputting the link destination attribute and the link destination number; and
sales processing unit that, in response to receiving the link destination attribute and the link destination number from a operation key attribute obtaining unit, reads out the PLU master information designated according to the link destination attribute and the link destination number in the displayed key group attribute information that corresponds to the pressed product key, and displays the PLU master information on the touch panel.

3. The display system according to claim 1, further comprising:
a key group set master memory unit that stores key group set master information for fifth and sixth key groups,
wherein:
the touch panel that displays the first key group and a fourth key group, the fourth key group including a product key and a second switching key that switches a display from displaying fourth key group to the fifth and sixth key groups on the display;

the key group master memory unit that stores key group master information for the fourth, the fifth, and the sixth key groups;

the operation key attribute obtaining unit that, in response to the pressed second switching key, obtains a link destination attribute and a link destination number in the displayed key group attribute information that corresponds to the second switching key and outputs the link destination attribute and the link destination number to the display switching unit; and the display switching unit that, in response to receiving the link destination attribute and the link destination number from the operation key attribute obtaining unit, reads out from the key group set master memory unit, the key group set master information designated according to a received link destination attribute and a received link destination number and replaces the fourth key group with the fifth and sixth key groups corresponding to the key group master information designated according to the link destination attribute and the link destination number in the key group set master information.

4. A display method, comprising:

displaying a first key group and a second key group simultaneously, the second key group including a product key and a first switching key, the first switching key configured to switch a display to replace the second key group with a third key group on one display of a touch panel;

replacing the second key group with the third key group on the display of the touch panel, in response to a pressing of the first switching key so that the first key group and the third key group are simultaneously displayed;

storing key group master information for the first, the second, and the third key groups in a key group master memory unit;

storing, as displayed key group attribute information, the key group master information of the first, the second, and the third key groups that are being displayed on the display of the touch panel in a displayed key group attribute information storage unit; and obtaining a link destination attribute and a link destination number in the displayed key group attribute information that corresponds to a first switching key, and outputting the link destination attribute and the link destination number to a display switching unit, in response to a pressing of the first switching key;

wherein the display switching unit, in response to receiving the link destination attribute and the link destination number from the operation key attribute obtaining unit, reads out from the key group master memory unit, the key group master information designated according to a received link destination attribute and a received link destination number in the displayed key group attribute information that corresponds to the pressed first switching key, and replaces only the second key group with the third key group corresponding to the key group master information designated according to the link destination attribute and the link destination number for display on the touch panel, and updates the displayed key group attribute information by replacing only the key group master information of the second key group with the third key group.

5. The display method according to claim 4, further comprising:

storing PLU master information including a product name and a product unit price in a price look-up (PLU) master memory unit;

obtaining a link destination attribute and a link destination number in the displayed key group attribute information that corresponds to a pressed product key and outputting the link destination attribute and the link destination number, in response to the pressed product key being pressed; and reading out the PLU master information designated according to the link destination attribute and the link destination number in the displayed key group attribute information that corresponds to the pressed product key, and displaying the PLU master information on the touch panel, in response to receiving the outputted link destination attribute and the outputted link destination number.

6. The display method according to claim 4, further comprising:

storing key group set master information for fifth and sixth key groups in the key group set master memory unit, displaying the first key group and a fourth key group, the fourth key group including a product key and a second switching key that switches a display from displaying fourth key group to the fifth and sixth key groups on the display;

storing key group master information for the fourth, the fifth, and the sixth key groups in the key group master memory unit;

obtaining a link destination attribute and a link destination number in the displayed key group attribute information that corresponds to the second switching key and outputting the link destination attribute and the link destination number to the display switching unit, in response to the pressed second switching key being pressed; and reading out from the key group set master memory unit, the key group set master information designated according to a received link destination attribute and a received link destination number and replacing the fourth key group with the fifth and sixth key groups corresponding to the key group master information designated according to the link destination attribute and the link destination number in the key group set master information, in response to receiving the outputted link destination attribute and the outputted link destination number.

\* \* \* \* \*